United States Patent
Han et al.

(10) Patent No.: US 7,573,672 B2
(45) Date of Patent: Aug. 11, 2009

(54) COVER MEMBER WITH AIR GUIDING PORTION AND HARD DISK DRIVE INCLUDING THE COVER MEMBER

(75) Inventors: Jaehyuk Han, Seoul (KR); No-yeol Park, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 417 days.

(21) Appl. No.: 11/514,275

(22) Filed: Sep. 1, 2006

(65) Prior Publication Data

US 2007/0047138 A1    Mar. 1, 2007

Related U.S. Application Data

(60) Provisional application No. 60/712,855, filed on Sep. 1, 2005.

(30) Foreign Application Priority Data

Sep. 1, 2005    (KR)    ............... 10-2005-0081319

(51) Int. Cl.
    *G11B 33/14*    (2006.01)
(52) U.S. Cl. ................................. 360/97.02
(58) Field of Classification Search ............... None
    See application file for complete search history.

(56) References Cited

U.S. PATENT DOCUMENTS 5,138,506 A * 8/1992 Beck et al. ............. 360/97.03
5,521,776 A * 5/1996 Mochizuki ............. 360/97.02
6,714,379 B1 * 3/2004 Thompson et al. ....... 360/97.02
6,721,128 B1 * 4/2004 Koizumi et al. ......... 360/97.02

FOREIGN PATENT DOCUMENTS

| JP | 4-358389 A | 12/1992 |
|---|---|---|
| JP | 04-358389 A | 12/1992 |
| JP | 05347089 A * | 12/1993 |
| JP | 11-297037 A | 10/1999 |
| KR | 10-2003-0068261 A | 8/2003 |
| KR | 10-2003-0086197 A | 11/2003 |

* cited by examiner

Primary Examiner—David D Davis
(74) Attorney, Agent, or Firm—Sughrue Mion, PLLC

(57) ABSTRACT

A cover member including an air guiding portion and an HDD including the cover member are provided. The HDD includes: a housing including a base member and a cover member; a spindle motor installed on the base member; a data storage disk mounted on the spindle motor; and an actuator rotatably installed on the base member, and including a read/write head for recording data onto the disk or reproducing data recorded on the disk. The cover member includes an air guiding portion protruding from a bottom surface of the cover member toward a surface of a data storage disk to guide an air flow generated by a rotation of the disk to the outside of the disk, and the air guiding portion has a width that changes along a rotating direction of the disk. Therefore, the air flow generated by the rotation of the disk can be guided outside of the disk by the air guiding portion formed on the cover member, and the air flows fast, and thus, the particles on the disk can be discharged outside of the disk efficiently.

17 Claims, 3 Drawing Sheets

COVER MEMBER WITH AIR GUIDING PORTION AND HARD DISK DRIVE INCLUDING THE COVER MEMBER

CROSS-REFERENCE TO RELATED PATENT APPLICATIONS

This application claims the benefit of Korean Patent Application No. 10-2005-0081319, filed on Sep. 1, 2005, in the Korean Intellectual Property Office, and U.S. Provisional Application No. 60/712,855, filed on Sep. 1, 2005, in the U.S. Patent and Trademark Office, the disclosures of which are incorporated herein in their entirety by reference.

BACKGROUND OF THE INVENTION

1. Field of the Invention

Apparatuses consistent with the present invention relate to a hard disk drive and, more particularly, to a cover member having an air guiding portion for guiding an air flow from around a disk to the outside of the disk and a hard disk drive including the cover member.

2. Description of the Related Art

A hard disk drive (HDD), one of the information storage devices of a computer, is used for reproducing data stored in a disk or recording data onto a disk using a read/write head.

A conventional HDD includes a housing having a base member and a cover member, a spindle motor installed on the base member, one or more data storage disks fixedly installed on the spindle motor, and an actuator for moving the read/write head for reproducing/recording data onto a predetermined position on the disk. The read/write head is moved to a predetermined position by the actuator while floating at a predetermined height from a recording surface of a rotating disk.

In the HDD having the above structure, when the disk rotates, air flows in the housing. The air flow circulates in the housing, and accordingly, particles in the housing circulate along the flowing air and are filtered by a filter installed at a predetermined location in the housing.

In a conventional HDD of 3.5 inches or 2.5 inches, a diameter of the disk is large and the rotation speed of the disk is high; that is, about 5,400 rpm or 7,200 rpm, and thus, the air flows sufficiently according to the rotation of the disk.

However, in a small and thin type small form factor (SFF) HDD, a diameter of the disk is small; that is, 1 inch or smaller, and the rotation speed is slow, about 3,600 rpm. Therefore, the air flow occurring due to the rotation of the disk is not sufficient, and thus, the particles on the disk cannot be easily discharged. Thus, the particles may stick onto the surface of the disk thereby damaging data recorded thereon, or may stick to the read/write head, thereby degrading the performance of the read/write head. In addition, the particles may collide with the read/write head and damage it.

SUMMARY OF THE INVENTION

The present invention provides a cover member having an air guiding portion which guides an air flow generated by a rotation of a disk toward the outside of the disk to remove particles from the disk efficiently, and an HDD including the cover member.

According to an aspect of the present invention, there is provided a cover member for a hard disk drive, the cover member including: an air guiding portion protruding from a bottom surface of the cover member toward a surface of a data storage disk and which guides an air flow generated by a rotation of the data storage disk outside of the data storage disk, wherein the air guiding portion has a width which changes along a rotating direction of the data storage disk.

The width of the air guiding portion may gradually increase from an upstream end portion of the air guiding portion, through which the air is guided, toward a downstream end portion which discharges the air.

An inner circumference of the air guiding portion may be concentrically formed with a rotating center of the data storage disk, and an outer circumference of the air guiding portion may be formed having a radius from the rotating center of the data storage disk which increases gradually along the rotating direction of the data storage disk.

The inner circumference of the air guiding portion may be adjacent to an outer circumference of a spindle motor for rotating the data storage disk.

The upstream end portion of the air guiding portion may be slanted with respect to a direction in which the air flows.

The air guiding portion may be unitarily formed with the cover member. The air guiding portion may be formed when performing a pressing process to form the cover member.

According to another aspect of the present invention, there is provided a hard disk drive (HDD) including: a housing including a base member and a cover member; a spindle motor installed on the base member; at least one data storage disk mounted on the spindle motor; and an actuator rotatably installed on the base member, and including a read/write head for recording data onto the data storage disk or reproducing data recorded on the data storage disk, wherein the cover member includes an air guiding portion which protrudes from a bottom surface of the cover member toward a surface of the data storage disk and which guides an air flow generated by a rotation of the data storage disk to the outside of the data storage disk, and the air guiding portion has a width that changes along a rotating direction of the data storage disk.

The width of the air guiding portion may gradually increase from an upstream end portion of the air guiding portion, through which the air is guided, toward a downstream end portion for discharging the air.

The HDD of claim 11, wherein an inner circumference of the air guiding portion is concentrically formed with a rotating center of the data storage disk, and an outer circumference of the air guiding portion is formed having a radius from the rotating center of the data storage disk which increases gradually along the rotating direction of the data storage disk.

The HDD may further include: a filter installed adjacent to a downstream end portion of the air guiding portion to collect particles in the air passing through the air guiding portion.

The filter may comprise an absorption filter disposed on the bottom surface of the cover member and located in front of the downstream end portion of the air guiding portion.

The filter may be a recirculation filter disposed on the base member, in front of the downstream end portion of the air guiding portion.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF EXEMPLARY EMBODIMENTS OF THE INVENTION

Figure 1:
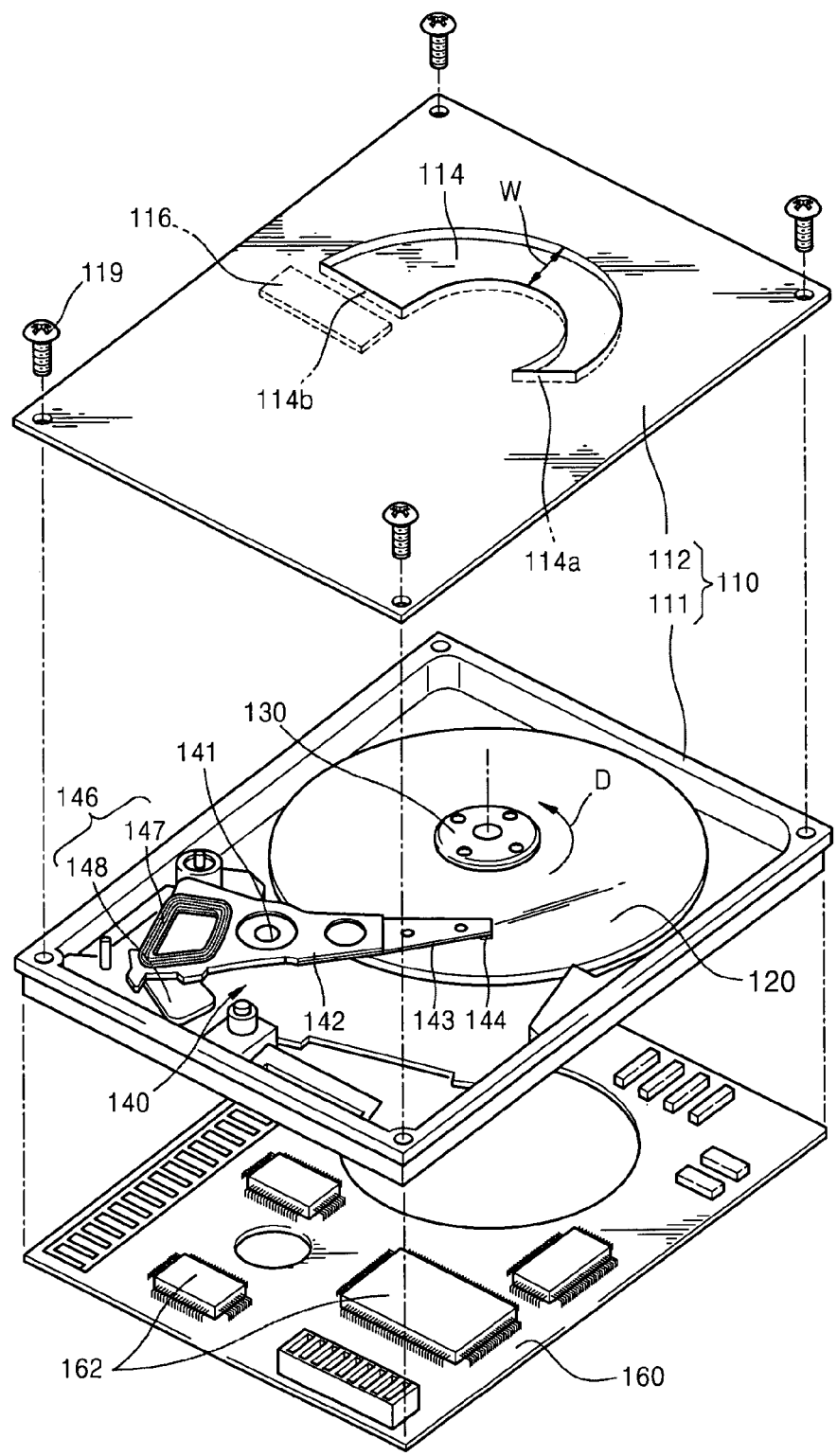
FIG. 1 is an exploded perspective view of an HDD including a cover member according to an exemplary embodiment of the present invention.
Figure 2:
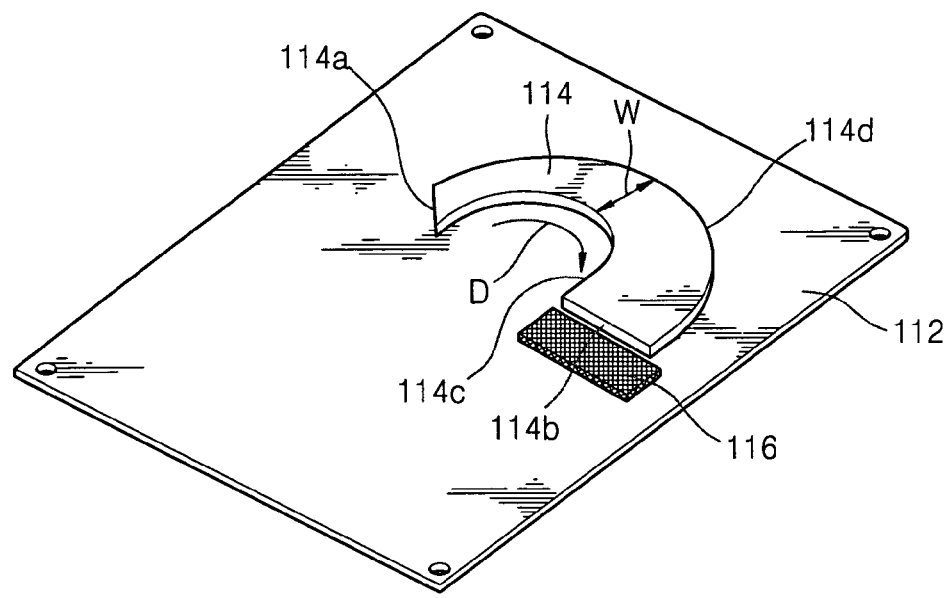
FIG. 2 is a perspective view of a bottom surface of the cover member of FIG. 1.
Figure 3:
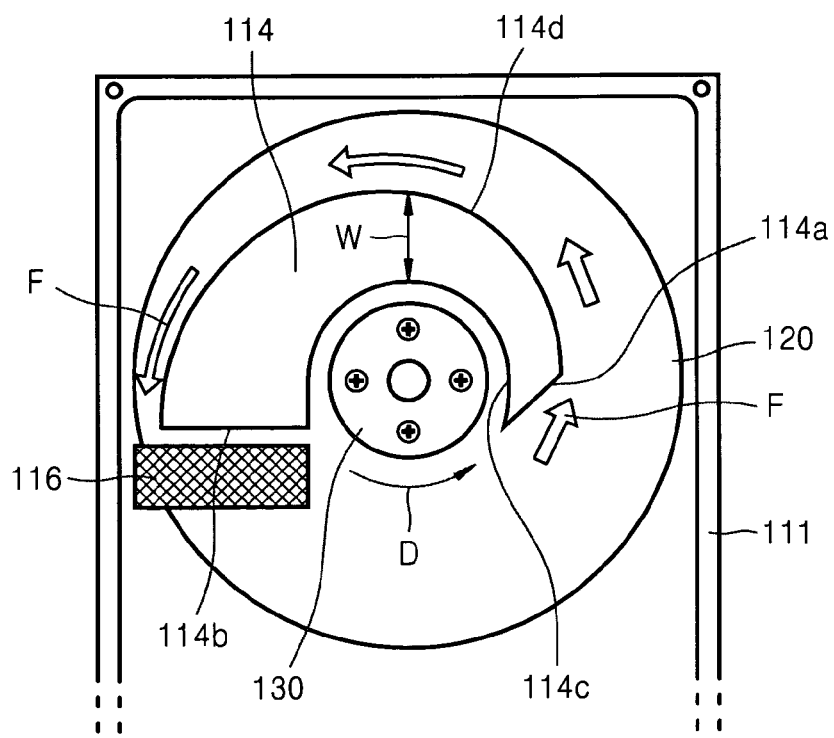
FIG. 3 is a plan view for illustrating operations of an air guiding portion of FIG. 1.

FIG. 1 is an exploded perspective view of an HDD including a cover member according to an exemplary embodiment of the present invention, FIG. 2 is a perspective view of a bottom surface of the cover member of FIG. 1, and FIG. 3 is a plan view for illustrating operations of an air guiding portion of FIG. 1.

Referring to FIG. 1, an HDD according to the present invention includes a housing 110 having a base member 111 and a cover member 112, a spindle motor 130 installed in the housing 110, a data storage disk 120, and an actuator 140 having a read/write head.

A printed circuit board 160 for driving the HDD may be coupled to a bottom surface of the base member 111, and a plurality of circuit devices 162 are mounted on the printed circuit board 160.

One or more disks 120 are installed on the spindle motor 130 as data storage media. The spindle motor 130 is installed on the base member 111 to rotate the disk 120.

The actuator 140 moves the read/write head that records data on the disk 120 or reproduces the recorded data at a predetermined position of the disk 120, and is rotatably installed on the base member 111. In more detail, the actuator 140 includes a swing arm 142 rotatably coupled to an actuator pivot 141 that is installed on the base member 111, a suspension 143 coupled to an end portion of the swing arm 142 to bias a slider 144, on which the read/write head is mounted, toward the surface of the disk 120, and a voice coil motor (VCM) 146 for rotating the swing arm 142. The VCM 146 includes a VCM coil 147 coupled to another end portion of the swing arm 142, and a magnet 148 facing the VCM coil 147.

The VCM 146 is controlled by a servo control system, and rotates the swing arm 142 in a direction according to Fleming's left-hand rule by an interaction between a current input to the VCM coil 147 and a magnetic field formed by the magnet 148. That is, when the disk 120 starts to rotate in a direction represented by the arrow D of FIG. 1, the VCM 146 rotates the swing arm 142 in a predetermined direction so that the slider 144, on which the read/write head is mounted, can be moved above the data recording surface of the disk 120. The slider 144 floats at a predetermined height from the surface of the disk 120 by a lift force generated by the rotating disk 120, and in this status, the read/write head mounted on the slider 144 reproduces or records the data from/on the data recording surface of the disk 120. On the contrary, when the HDD does not operate, that is, when the disk 120 does not rotate, the VCM 146 rotates the swing arm 142 in the opposite direction so that the slider 144, on which the read/write head is mounted, can be separated from the data recording surface of the disk 120.

The cover member 112 is coupled to an upper portion of the base member 111 by a plurality of coupling screws 119 to protect the disk 120, the spindle motor 130, and the actuator 140. The cover member 112 is generally formed of stainless steel or aluminum, but is not limited thereto. For example, the cover member 112 can be fabricated by pressing a stainless steel plate.

Referring to FIGS. 1 through 3, the cover member 112 includes an air guiding portion 114 for guiding the air flow generated by the rotation of the disk 120 to the outside of the disk 120. The air guiding portion 114 is disposed on the bottom surface of the cover member 112 to correspond to the surface of the disk 120, and protrudes from the bottom surface of the cover member 112 toward the disk 120. In more detail, the air guiding portion 114 extends along the rotating direction (D) of the disk 120 and generally forms a circular arc. In particular, a width (W) of the air guiding portion 114 is changed along the rotating direction (D) of the disk 120. That is, the width W of the air guiding portion 114 gradually increases from an upstream end portion 114a, through which the air is guided, toward a downstream end portion 114b, through which the air is discharged.

In more detail, an inner circumference 114c of the air guiding portion 114 is spaced apart from an outer circumference of the spindle motor 130 at a predetermined distance. That is, the inner circumference 114c of the air guiding portion 114 is formed concentric with a rotating center of the disk 120. The inner circumference 114c of the air guiding portion 114 may be as close to the outer circumference of the spindle motor 130 as possible. An outer circumference 114d of the air guiding portion 114 can be formed having a radius from the rotating center of the disk 120 which increases gradually along the rotating direction of the disk 120. Therefore, a distance between an outer edge of the disk 120 and the outer circumference 114d of the air guiding portion 114 becomes smaller along the rotating direction D of the disk 120.

In addition, the upstream end portion 114a of the air guiding portion 114 is slanted with respect to a direction (F) of air flow so as to sufficiently guide the air flow toward the outer circumference 114d.

The air guiding portion 114 may be integrally formed with the cover member 112. That is, when the cover member 112 is fabricated using a pressing process, the air guiding portion 114 can be formed simultaneously with the cover member to protrude from the bottom surface of the cover member 112. Thus, an additional member for forming the air guiding portion 114 is not required, and accordingly, fabrication costs and weight of the cover member are not increased.

However, the air guiding portion 114 is not limited to the above example, and can be attached onto the bottom surface of the cover member 112 as an additional member.

Hereinafter, operation of the air guiding portion 114 will be described with reference to FIG. 3.

When the spindle motor 130 starts to rotate the disk 120 in the direction D, the air flow (F) occurs in the same direction as the rotating direction D of the disk 120. The air flow F is guided toward the outer circumference 114d of the air guiding portion 114 by the slanted upstream end portion 114a of the air guiding portion 114. In addition, the air flows between the outer circumference 114d of the air guiding portion 114 and the side wall of the base member 111 along the rotating direction D of the disk 120. Since the distance between the outer circumference 114d of the air guiding portion 114 and the outer edge of the disk 120 becomes narrower along the rotating direction of the disk 120, the air is guided gradually to the outer portion of the disk 120. In addition, since the distance between the outer circumference 114d of the air guiding portion 114 and the side wall of the base member 111 becomes narrower toward the downstream end portion 114b of the air guiding portion 114, the air flow F is faster. Therefore, the particles on the disk 120 can be discharged efficiently outside of the disk 120 with the air flow F, and thus, damage to the disk 120 and the read/write head due to the particles and the performance degradation of the disk 120 and the read/write head can be prevented.

In addition, the cover member 112 can further include a filter 116 adjacent to the downstream end portion 114b of the air guiding portion 114. In detail, the filter 116 may be an absorption filter, which may be attached onto the bottom surface of the cover member 112 so as to be located at a front portion of the downstream end portion 114b of the air guiding portion 114. Therefore, the particles discharged outside of the disk 120 with the flowing air can be collected efficiently by the absorption filter 116.

Figure 4:
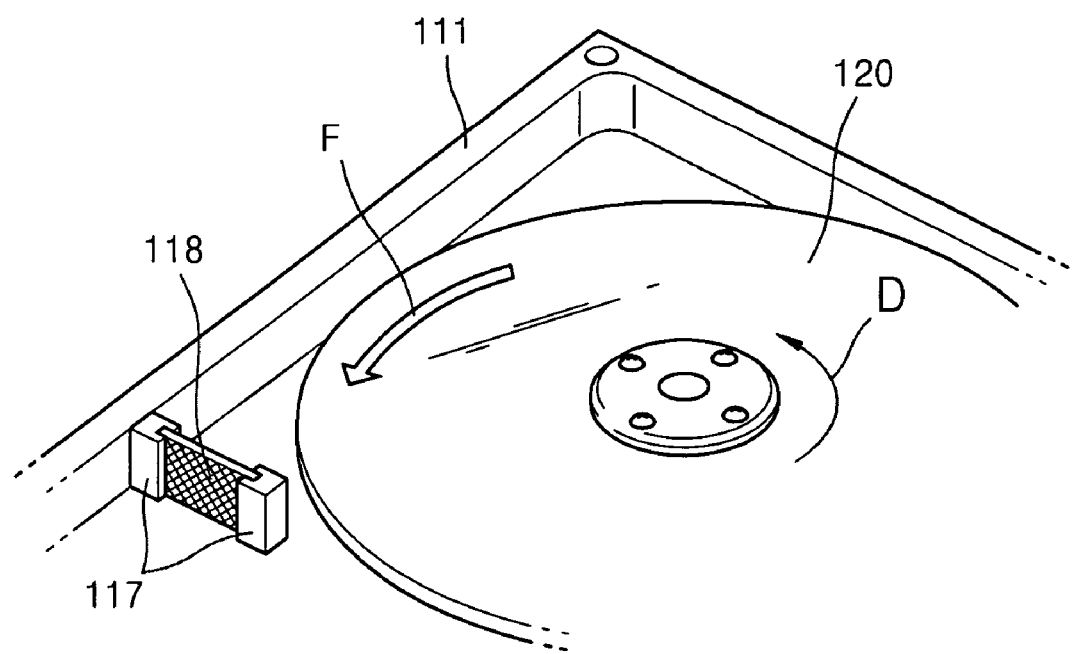
FIG. 4 is a partial perspective view of the base member of FIG. 1 having another filter.

FIG. 4 is a partial perspective view of the base member 111 having another filter.

Referring to FIG. 4, a recirculation filter 118 can be installed on the base member 111 of the HDD in order to filter the particles discharged outside of the disk 120 with the flowing air. The recirculation filter 118 is located in front of the lower end portion 114b of the air guiding portion 114, and can be supported by a filter holder 117 fixedly installed on the base member 111.

In addition, the recirculation filter 118 can be used instead of the absorption filter 116 of FIGS. 1 through 3, or can be used with the absorption filter 116.

As described above, consistent with the present invention, the air flow generated by the rotation of the disk can be guided outside of the disk by the air guiding portion formed on the cover member, and the air flow is faster than in the related art. Therefore, the particles on the disk can be discharged outside of the disk efficiently, and thus, damage to and performance degradation of the disk and the read/write head due to the particles can be prevented.

In addition, the particles discharged outside of the disk can be collected efficiently by the filter installed adjacent to the downstream end portion of the air guiding portion that is formed on the cover member.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A cover member for a hard disk drive, the cover member comprising:
   an air guiding portion protruding from a bottom surface of the cover member toward a surface of a data storage disk and which guides an air flow generated by a rotation of the data storage disk outside of the data storage disk,
   wherein the air guiding portion has a width which changes along a rotating direction of the data storage disk and the width of the air guiding portion gradually increases from an upstream end portion of the air guiding portion, through which the air is guided, toward a downstream end portion which discharges the air.

2. The cover member of claim 1, wherein an inner circumference of the air guiding portion is concentrically formed with a rotating center of the data storage disk, and an outer circumference of the air guiding portion is formed having a radius from the rotating center of the data storage disk which increases gradually along the rotating direction of the data storage disk.

3. The cover member of claim 2, wherein the inner circumference of the air guiding portion is adjacent to an outer circumference of a spindle motor for rotating the data storage disk.

4. The cover member of claim 1, wherein the upstream end portion of the air guiding portion is slanted with respect to a direction in which the air flows.

5. The cover member of claim 1, wherein the air guiding portion is unitarily formed with the cover member.

6. The cover member of claim 5, wherein the air guiding portion is formed when performing a pressing process to form the cover member.

7. The cover member of claim 1, wherein a filter is attached on the bottom surface of the cover member in front of the downstream end portion of the air guiding portion to collect particles in the flowing air.

8. The cover member of claim 7, wherein the filter comprises an absorption filter.

9. A hard disk drive (HDD) comprising:
   a housing including a base member and a cover member;
   a spindle motor installed on the base member;
   at least one data storage disk mounted on the spindle motor; and
   an actuator rotatably installed on the base member, and including a read/write head for recording data onto the data storage disk or reproducing data recorded on the data storage disk,
   wherein the cover member includes an air guiding portion which protrudes from a bottom surface of the cover member toward a surface of the data storage disk and which guides an air flow generated by a rotation of the data storage disk to the outside of the data storage disk, and the air guiding portion has a width that changes along a rotating direction of the data storage disk, and
   wherein the width of the air guiding portion gradually increases from an upstream end portion of the air guiding portion, through which the air is guided, toward a downstream end portion for discharging the air.

10. The HDD of claim 9, wherein an inner circumference of the air guiding portion is concentrically formed with a rotating center of the data storage disk, and an outer circumference of the air guiding portion is formed having a radius from the rotating center of the data storage disk which increases gradually along the rotating direction of the data storage disk.

11. The HDD of claim 10, wherein the inner circumference of the air guiding portion is adjacent to an outer circumference of the spindle motor for rotating the data storage disk.

12. The HDD of claim 9, wherein the upstream end portion of the air guiding portion is slanted with respect to a direction in which the air flows.

13. The HDD of claim 9, wherein the air guiding portion is unitarily formed with the cover member.

14. The HDD of claim 13, wherein the air guiding portion is formed when performing a pressing process to form the cover member.

15. The HDD of claim 9, further comprising:
   a filter disposed adjacent to a downstream end portion of the air guiding portion to collect particles in the air passing through the air guiding portion.

16. The HDD of claim 15, wherein the filter comprises an absorption filter disposed on the bottom surface of the cover member and located in front of the downstream end portion of the air guiding portion.

17. The HDD of claim 15, wherein the filter comprises a recirculation filter disposed on the base member, in front of the downstream end portion of the air guiding portion.

* * * * *